US009237400B2

(12) United States Patent
Sehlstrom et al.

(10) Patent No.: US 9,237,400 B2
(45) Date of Patent: Jan. 12, 2016

(54) CONCEALMENT OF INTERMITTENT MONO RECEPTION OF FM STEREO RADIO RECEIVERS

(75) Inventors: Leif Sehlstrom, Järfälla (SE); Heiko Purnhagen, Sundyberg (SE); Jonas Engdegard, Stockholm (SE)

(73) Assignee: Dolby International AB, Amsterdam (NL)

( * ) Notice: Subject to any disclaimer, the term of this patent is extended or adjusted under 35 U.S.C. 154(b) by 249 days.

(21) Appl. No.: 13/816,459

(22) PCT Filed: Aug. 16, 2011

(86) PCT No.: PCT/EP2011/064084
§ 371 (c)(1), (2), (4) Date: Feb. 11, 2013

(87) PCT Pub. No.: WO2012/025431
PCT Pub. Date: Mar. 1, 2012

(65) Prior Publication Data

US 2013/0142340 A1 Jun. 6, 2013

Related U.S. Application Data

(60) Provisional application No. 61/376,569, filed on Aug. 24, 2010.

(51) Int. Cl.
*H04R 5/00* (2006.01)
*H04B 1/16* (2006.01)
(Continued)

(52) U.S. Cl.
CPC .............. *H04R 5/00* (2013.01); *G10L 21/0364* (2013.01); *H04B 1/1676* (2013.01); *H04H 40/81* (2013.01); *G10L 19/005* (2013.01); *G10L 19/008* (2013.01)

(58) Field of Classification Search
CPC ........ H04R 5/00; H04H 40/81; H04B 1/1676; G10L 21/0205; G10L 19/005; G10L 19/008
USPC ......... 370/487; 381/1, 3, 17, 22, 23; 455/296; 704/219, 500, 501, 503; 707/621, 727; 725/93
See application file for complete search history.

(56) References Cited

U.S. PATENT DOCUMENTS 5,068,896 A 11/1991 Short
5,341,457 A 8/1994 Hall, II
(Continued)

FOREIGN PATENT DOCUMENTS

EP 0955732 11/1999
JP 8-331698 12/1996
(Continued)

OTHER PUBLICATIONS

Purnhagen, H. "Low Complexity Parametric Stereo Coding in MPEG-4" Proc. of the International Conference on Digital Audioeffects, Oct. 5, 2004, pp. 163-168.
(Continued)

*Primary Examiner* — Gerald Gauthier

(57) ABSTRACT

The present invention relates to audio signal processing. In particular, it relates to a method and system for reliably concealing intermittent mono reception of FM stereo radio receivers. The system comprises a parametric stereo parameter estimation stage configured to determine a first parametric stereo parameter based on a first frame of the received two-channel audio signal. The system further comprises a concealment detection stage configured to determine an energy of a side signal within the first signal frame; determine a number of following successive signal frames during which the energy of the side signal drops from a value above the high threshold to a value below a low threshold; determine that the two-channel audio signal following the first signal frame is a forced mono signal if the number of successive signal frames is below a frame threshold; and determine the parametric stereo parameter based on the first parametric stereo parameter.

21 Claims, 7 Drawing Sheets

(51) Int. Cl.

| | |
|---|---|
| ***H04H 40/81*** | (2008.01) |
| ***G10L 21/0364*** | (2013.01) |
| *G10L 19/005* | (2013.01) |
| *G10L 19/008* | (2013.01) |

(56) References Cited

U.S. PATENT DOCUMENTS

| | | | | |
|---|---|---|---|---|
| 5,682,463 | A | 10/1997 | Allen | |
| 6,466,912 | B1 | 10/2002 | Johnston | |
| 7,406,302 | B1 | 7/2008 | Lou | |
| 7,487,097 | B2 * | 2/2009 | Engdegard et al. | 704/500 |
| 7,542,896 | B2 | 6/2009 | Schuijers | |
| 7,573,912 | B2 * | 8/2009 | Lindblom | 370/487 |
| 7,734,473 | B2 * | 6/2010 | Schuijers et al. | 704/503 |
| 7,751,572 | B2 * | 7/2010 | Villemoes et al. | 381/23 |
| 7,822,617 | B2 * | 10/2010 | Taleb et al. | 704/501 |
| 8,135,136 | B2 * | 3/2012 | Van Loon et al. | 381/1 |
| 8,218,775 | B2 * | 7/2012 | Norvell et al. | 381/23 |
| 8,374,883 | B2 * | 2/2013 | Zhong et al. | 704/500 |
| 8,428,958 | B2 * | 4/2013 | Sung et al. | 704/500 |
| 8,468,130 | B2 * | 6/2013 | Bhandari | G06F 17/30905 707/621 |
| 8,494,863 | B2 * | 7/2013 | Biswas et al. | 704/500 |
| 8,553,891 | B2 * | 10/2013 | Szczerba et al. | 381/1 |
| 8,713,005 | B2 * | 4/2014 | Benson | G06F 17/30905 707/727 |
| 8,793,749 | B2 * | 7/2014 | Bennett | 725/116 |
| 8,929,558 | B2 * | 1/2015 | Engdegard | G10L 19/008 381/10 |
| 9,094,754 | B2 * | 7/2015 | Engdegard | G10L 19/008 1/1 |
| 2004/0039464 | A1 | 2/2004 | Virolainen | |
| 2005/0182996 | A1 | 8/2005 | Bruhn | |
| 2009/0203344 | A1 | 8/2009 | Hanawalt | |
| 2010/0106493 | A1 * | 4/2010 | Zhou et al. | 704/219 |
| 2012/0002818 | A1 * | 1/2012 | Heiko et al. | 381/22 |
| 2012/0207307 | A1 | 8/2012 | Engdegard et al. | |
| 2013/0142339 | A1 * | 6/2013 | Engdegard | G10L 19/008 381/17 |
| 2013/0142340 | A1 * | 6/2013 | Sehlstrom | G10L 21/0364 381/17 |
| 2014/0226822 | A1 * | 8/2014 | Engdegard | G10L 25/69 381/13 |
| 2014/0235192 | A1 * | 8/2014 | Purnhagen | G10L 19/008 455/296 |
| 2015/0025896 | A1 * | 1/2015 | Purnhagen | H04M 3/56 704/500 |
| 2015/0104021 | A1 * | 4/2015 | Riedmiller | G10L 19/18 381/22 |
| 2015/0154970 | A1 * | 6/2015 | Purnhagen | G10L 19/18 704/500 |
| 2015/0187361 | A1 * | 7/2015 | Purnhagen | G10L 19/18 381/22 |

FOREIGN PATENT DOCUMENTS

| | | |
|---|---|---|
| WO | 03/007656 | 1/2003 |
| WO | 2008/031611 | 3/2008 |
| WO | 2008/032255 | 3/2008 |
| WO | 2009/035615 | 3/2009 |
| WO | 2010/012927 | 2/2010 |
| WO | 2012/025429 | 3/2012 |

OTHER PUBLICATIONS

ISO/IEC 23003-1:2007, Information Technology—MPEG Audio Technologies—Part 1: MPEG Surround, 2007.

ISO/IEC 14496-3:2005, Information Technology—Coding of Audio-Visual Objects—Part 3:Audio, 2005.

Baumgarte, F. et al. "Binaural Cue Coding—Part 1: Psychoacoustic Fundamentals and Design Principles" IEEE Transactions on Speech and Audio Processing, vol. 11, No. 6, Nov. 2003, pp. 509-519.

Faller, C. et al. "Binaural Cue Coding—Part II: Schemes and Applications" IEEE Transactions on Speech and Audio Processing, vol. 11, No. 6, Nov. 2003, pp. 520-531.

* cited by examiner

Conditions:
A: $E_S$ > ref_high
B: ref_low < $E_S$ < ref_high
C: $E_S$ < ref_low

States:
1: Stereo
2: Authentic mono (previously stereo)
3: Authentic mono (previously mono or intermediate)
4: Forced Mono: ConcealFirst
5: Forced Mono: Conceal

CONCEALMENT OF INTERMITTENT MONO RECEPTION OF FM STEREO RADIO RECEIVERS

CROSS-REFERENCE TO RELATED APPLICATIONS

This application is the U.S. national stage of International Application PCT/EP2011/064084, filed 16 Aug. 2011, which in turn claims priority to U.S. Provisional Patent Application No. 61/376,569, filed 24 Aug. 2010, each of which are hereby incorporated by reference in its entirety.

TECHNICAL FIELD

The present document relates to audio signal processing, in particular to an apparatus and a corresponding method for improving an audio signal of an FM stereo radio receiver. In particular, the present document relates to a method and system for reliably concealing intermittent mono reception of FM stereo radio receivers.

BACKGROUND OF THE INVENTION

In an analog FM (frequency modulation) stereo radio system, the left channel (L) and right channel (R) of the audio signal are conveyed in a mid-side (M/S) representation, i.e. as mid channel (M) and side channel (S). The mid channel M corresponds to a sum signal of L and R, e.g. M=(L+R)/2, and the side channel S corresponds to a difference signal of L and R, e.g. S=(L−R)/2. For transmission, the side channel S is modulated onto a 38 kHz suppressed carrier and added to the baseband mid signal M to form a backwards compatible stereo multiplex signal. This multiplex signal is then used to modulate the HF (high frequency) carrier of the FM transmitter, typically operating in the range between 87.5 to 108 MHz.

When reception quality decreases (i.e. the signal-to-noise ratio over the radio channel decreases), the S channel typically suffers more than the M channel. In many FM receiver implementations, the S channel is muted when the reception conditions gets too noisy. This means that the receiver falls back from stereo to mono in case of a poor HF radio signal.

Even in case the mid signal M is of acceptable quality, the side signal S may be noisy and thus can severely degrade the overall audio quality when being mixed in the left and right channels of the output signal (which are derived e.g. according to L=M+S and R=M−S). When a side signal S has only poor to intermediate quality, there are two options: either the receiver chooses accepting the noise associated with the side signal S and outputs a real stereo signal comprising a noisy left and right signal, or the receiver drops the side signal S and falls back to mono.

Parametric Stereo (PS) coding is a technique from the field of very low bitrate audio coding. PS allows encoding a 2-channel stereo audio signal as a mono downmix signal in combination with additional PS side information, i.e. the PS parameters. The mono downmix signal is obtained as a combination of both channels of the stereo signal. The PS parameters enable the PS decoder to reconstruct a stereo signal from the mono downmix signal and the PS side in information. Typically, the PS parameters are time and frequency-variant, and the PS processing in the PS decoder is typically carried out in a hybrid filterbank domain incorporating a QMF bank. The document "Low Complexity Parametric Stereo Coding in MPEG-4", Heiko Purnhagen, Proc. Digital Audio Effects Workshop (DAFx), pp. 163-168, Naples, IT, October 2004 describes an exemplary PS coding system for MPEG-4. Its discussion of parametric stereo is hereby incorporated by reference. Parametric stereo is supported e.g. by MPEG-4 Audio. Parametric stereo is discussed in section 8.6.4 and Annexes 8.A and 8.C of the MPEG-4 standardization document ISO/IEC 14496-3:2005 (MPEG-4 Audio, $3^{rd}$ edition). These parts of the standardization document are hereby incorporated by reference for all purposes. Parametric stereo is also used in the MPEG Surround standard (see document ISO/IEC 23003-1:2007, MPEG Surround). Also, this document is hereby incorporated by reference for all purposes. Further examples of parametric stereo coding systems are discussed in the document "Binaural Cue Coding—Part I: Psychoacoustic Fundamentals and Design Principles," Frank Baumgarte and Christof Faller, IEEE Transactions on Speech and Audio Processing, vol 11, no 6, pages 509-519, November 2003, and in the document "Binaural Cue Coding—Part II: Schemes and Applications," Christof Faller and Frank Baumgarte, IEEE Transactions on Speech and Audio Processing, vol 11, no 6, pages 520-531, November 2003. In the latter two documents the term "binaural cue coding" is used which is an example of parametric stereo coding.

In the present document, a method and system is described which is based on the generation of PS parameters. The PS parameters are used to generate a low noise stereo signal even when a side signal of poor quality is received. Furthermore, an error concealment method is described which may be used to conceal intermediate fall backs to mono, by maintaining previously estimated PS parameters. A problem in this context is that mono dropout situations need to be detected in an efficient and reliable manner. In view of this, the present document describes a mechanism for detecting and concealing mono dropout situations.

SUMMARY OF THE INVENTION

According to an aspect, a system configured to generate an output stereo signal and/or configured to determine a parametric stereo parameter from a two channel audio signal is described. The two-channel audio signal may be received at an FM stereo radio receiver, which is e.g. part of a wireless communication device. The received two-channel audio signal may be presentable as a mid signal and a side signal. In other words, the two-channel audio signal may comprise a mid signal and a side signal or may comprise signals which are representable as a mid signal and a side signal. The mid signal and the side signal may be derived from a left signal and a right signal. In yet other words, the mid signal and/or the side signal may be obtainable from the two-channel audio signal. As such, the two-channel audio signal may comprise information from which a mid signal and a side signal can be derived. In an embodiment, the mid signal M and the side signal S relate to the left audio signal L and the right audio signal R, as M=(L+R)/2 and S=(L−R)/2. The output stereo signal is typically representable of a left signal and a right signal. Alternatively, the output stereo signal may be referred to as a two-channel output signal. This two-channel output signal may carry a mono audio signal or a stereo audio signal. In particular, if the left signal of the two-channel output signal corresponds to the right signal of the two-channel output signal, the two-channel output signal typically carries a mono audio signal.

The system may comprise a parametric stereo parameter estimation stage configured to determine a first parametric stereo parameter (or at least one first parametric stereo parameter) based on a first frame of the received two-channel audio signal. In other words, an excerpt of the received two-channel audio signal may be used to determine a first parametric stereo parameter, e.g. a parameter indicating a channel level difference and/or a parameter indicating an inter-channel cross-correlation. The excerpt may be referred to as a signal frame. The parametric stereo parameter estimation stage may be configured to determine a new parametric stereo parameter (or at least one new parametric stereo parameter) for each succeeding frame of the received two-channel audio signal.

The system may comprise a concealment detection stage configured to determine an energy of the side signal within the first signal frame. The energy of the side signal within a signal frame may be determined based on the root mean square value of the samples of the side signal within the signal frame. The concealment detection stage may be configured to determine that the energy of the side signal within the first signal frame is above a high threshold.

The concealment detection stage may be configured to determine a number of following successive signal frames during which the energy of the side signal ($E_s$) drops from a value above the high threshold to a value below a low threshold. The number of following successive signal frames may be referred to as the transition period from a high energy side signal ($E_s$>high threshold) to a low energy side signal ($E_s$<low threshold). In other words, the concealment detection stage may be configured to determine that the energy of the side signal of a certain number of signal frames which directly succeed the first signal frame is lower than the high threshold and eventually drops below a low threshold. In particular, the concealment detection stage may be configured to determine the exact number of signal frames during which the energy drops from an energy above the high threshold to an energy below the low threshold. Even more particularly, the concealment detection stage may be configured to determine that the two-channel audio signal following the first signal frame is a deteriorated stereo signal or a forced mono signal if the number of successive signal frames, i.e. if the transition period, is below a frame threshold. In an embodiment, the frame threshold may be one or more signal frames, e.g. any of 1, 2, 3 or 4 signal frames.

The concealment detection stage may be configured to determine the parametric stereo parameter based on the first parametric stereo parameter, in particular, if a forced mono signal has been detected. The parametric stereo parameter may be used for the processing of the two-channel audio signal. In particular, the parametric stereo parameter may be used for the processing of frames of the two-channel audio signal succeeding the first signal frame of the two-channel audio signal.

The system may comprise an upmix stage configured to generate a frame of the output stereo signal following the first signal frame based on an auxiliary audio signal and based on the first parametric stereo parameter. In other words, if it is determined that the received two-channel audio signal following the first signal frame is a forced mono signal, e.g. a stereo signal where the side signal is very small, e.g. has little energy, then the succeeding frames of the output stereo signal are determined from the first parametric stereo parameter, i.e. from a first parametric stereo parameter which has been determined based on a frame of the received two-channel audio signal which was not deteriorated. On the other hand, the auxiliary audio signal may be obtained from the received two-channel audio signal following the first signal frame, i.e. the auxiliary audio signal may be determined from the frames of the received two-channel audio signal which correspond to the frames of the output stereo signal. In an embodiment, the auxiliary audio signal is determined as (L+R)/a, wherein a is a real number, e.g. two. I.e. the auxiliary audio signal may correspond to the mid signal comprised within the received two-channel audio signal.

The concealment detection stage may be further configured to determine that the two-channel audio signal following the first signal frame is an authentic mono signal if the number of successive signal frames is at or above the frame threshold. As such, the concealment detection stage may be configured to detect a transition from a stereo signal to an authentic mono signal (e.g. a speech signal) by determining the number of signal frames which it takes for the energy of the side signal to drop from above the high threshold to below the low threshold.

The concealment detection stage may be configured as a state machine. In particular, the concealment detection stage may comprise a plurality of states specifying a plurality of modes of the overall system. A mode of the system typically determines how a current frame of the received two-channel audio signal is processed. In particular, the processing of the upmix stage may depend on the current state of the system. The concealment detection stage may also comprise a plurality of edges specifying transition conditions between the plurality of states. As such, an edge between two states may specify a condition which is to be met for the system to pass from a current state to a succeeding state. The condition may comprise one or more conditions, e.g. conditions regarding the energy of the succeeding frame of the side signal, a time constraint, a number of frame constraint, etc. By specifying the transition conditions between states, an edge may determine how an immediately succeeding frame to the current frame of the two-channel audio signal is processed.

The plurality of states may comprise a stereo state, i.e. a state during which the system processes the two-channel audio signal as a non-deteriorated stereo signal. If the system is in the stereo state the parametric stereo parameter estimation stage may be configured to determine a current parametric stereo parameter based on the current frame of the received two-channel audio signal. The upmix stage may be configured to generate a current frame of the output stereo signal based on the auxiliary audio signal and the current parametric stereo parameter. The auxiliary audio signal may be obtained from the current frame of the received two-channel audio signal. In particular the auxiliary audio signal may be obtained from the current frame of the mid signal comprised within the received two-channel audio signal. It should be noted that alternatively or in addition, the system may bypass the upmix stage and determine the output stereo signal directly from the two-channel audio signal. In particular, a frame of the output stereo signal could be directly determined, e.g. copied, from a frame of the received two-channel audio signal.

The plurality of states may comprise an authentic mono state, i.e. a state during which the system processes the received two-channel audio signal as an authentic mono signal, such as e.g. a speech signal. If the system is in the authentic mono state, the parametric stereo parameter estimation stage may be configured to determine a current parametric stereo parameter based on the current frame of the received two-channel audio signal. The upmix stage may be configured to generate a current frame of the output stereo signal based on the auxiliary audio signal and the current parametric stereo parameter. The auxiliary audio signal may be obtained from the current frame of the received two-channel audio signal. It should be noted that in a similar manner to the stereo state, the system may operate in a bypass mode during authentic mono operation.

The plurality of states may comprise a concealment state, i.e. a state during which the system conceals the forced mono signal. If the system is in the concealment state the upmix stage may be configured to generate a current frame of the output stereo signal based on the auxiliary audio signal and a stored parametric stereo parameter. As such the upmix stage may be configured to determine the output stereo signal based on a previously determined parametric stereo parameter, and to thereby conceal the mono signal comprised within a currently received side signal frame. In a similar manner to the other states, the auxiliary audio signal may be obtained from the current frame of the received two-channel audio signal. On the other hand, the stored parametric stereo parameter may have been determined by the parametric stereo parameter estimation stage while the system was in a previous stereo state. In an embodiment, the stored parametric stereo parameter has been determined from a plurality of parametric stereo parameters, preferably by smoothing or averaging. By taking into account parametric stereo parameters which have been determined for different signal frames prior to reaching the concealment state, it may be ensured that the system does not use awkward parametric stereo parameters during the concealment state. Furthermore, the stored parametric stereo parameter may be time dependent. In particular, the stored parametric stereo parameter may decay to mono as a function of time. In other words, the stored parametric stereo parameter may transit to a parametric stereo parameter which is adapted for generating a mono audio signal. The time interval for such a transition may be variable.

The plurality of edges may comprise one or more of the following edges: a transition from the stereo state to the authentic mono state, if the energy of the succeeding frame is below the high threshold and above the low threshold; a transition from the stereo state to the concealment state, if the energy of the succeeding frame is below the low threshold; a transition from the concealment state to the authentic mono state, if the energy of the succeeding frame is below the high threshold and above the low threshold; a transition from the concealment state to the stereo state, if the energy of the succeeding frame is above the high threshold; and/or a transition from the authentic mono state to the stereo state, if the energy of the succeeding frame is above the high threshold. In an embodiment, the transition from the authentic mono state to the concealment state further depends on the number of frames preceding the current frame for which the system is in the authentic mono state. Alternatively or in addition, the transition from the authentic mono state to the concealment state may only occur if the number of frames preceding the current frame for which the system is in the authentic mono state is below the frame threshold.

The concealment detection stage may be further configured to determine a spectral flatness of the succeeding frame of the side signal. The spectral flatness may be determined based on the power spectrum of a frame of the side signal. The power spectrum may comprise a plurality of energy values associated with a respective plurality of frequency bands. The spectral flatness may be determined as the ratio between the geometric mean of the plurality of energy values and the arithmetic mean of the plurality of energy values. As such, a spectral flatness close to zero indicates a concentrated power spectrum, wherein a spectral flatness towards one indicates a flat power spectrum, i.e. the power spectrum of a noisy signal. The concealment detection stage may be configured to consider the spectral flatness in a transition condition of at least one of the plurality of edges. I.e. a transition condition of an edge of the concealment stage may take into account that the succeeding frame of the side signal does or does not comprise a high degree of noise. In particular, the transition from the authentic mono state to the stereo state may depend on the spectral flatness of the succeeding frame. Even more particularly, the transition from the authentic mono state to the stereo state may only occur if the spectral flatness is below a flatness threshold. As such, a false transition from the authentic mono state to the stereo state caused by a noise burst in the side signal can be avoided. This also avoids a transition from the authentic mono state to the concealment state (via the stereo state) which would lead to an undesired concealment of an authentic mono signal.

The system may comprise a noise estimation stage. The noise estimation stage may be configured to determine a noise parameter characteristic for the noise power of the received side signal. Furthermore, the parametric stereo parameter estimation stage may be configured to determine the parametric stereo parameter, i.e. the first or current parametric stereo parameter, based on the received two-channel audio signal and the noise parameter.

The system may further comprise an audio encoder supporting parametric stereo. The audio encoder may comprise a parametric stereo encoder, with the parametric stereo parameter estimation stage being part of the parametric stereo encoder.

According to a further aspect, an FM stereo radio receiver is described. The FM stereo radio receiver may be configured to receive an FM radio signal comprising or presentable as a mid signal and a side signal. Furthermore, the FM stereo radio receiver may comprise a system having any one or more of the features and functions outlined in the present document.

According to another aspect, a mobile communication device, e.g. a cellular telephone or a smart phone, is described. The mobile communication device may comprise an FM stereo receiver configured to receive an FM radio signal comprising or presentable as a mid signal and a side signal. Furthermore, the mobile communication device may comprise a system according to any one or more of the features and functions outlined in the present document.

According to a further aspect, a method for generating an output stereo signal (or a two-channel output signal) and/or for determining a parametric stereo parameter from a received two-channel audio signal is described. The received two-channel audio signal may comprise or be presentable as a mid signal and a side signal. The method may comprise the step of determining a first parametric stereo parameter based on a first frame of the received two-channel audio signal. The method may proceed in determining an energy of the side signal within the first signal frame and in determining that the energy of the side signal within the first signal frame is above a high threshold. Furthermore, the method may comprise the step of determining a number of following successive signal frames, e.g. signal frames which directly follow the first signal frame, during which the energy of the side signal drops from a value above the high threshold to a value below a low threshold. In particular, the method may determine the number of frames during which the energy of the side signal drops from a value above the high threshold to a value below the low threshold. Subsequently, the method may proceed in determining that the two-channel audio signal following the first signal frame is a deteriorated stereo signal or a forced mono signal if the number of successive signal frames is below a frame threshold. If this is the case, i.e. if it is determined that the two-channel audio signal following the first signal frame is a forced mono signal, the method may comprise the step of determining the parametric stereo parameter based on the first parametric stereo parameter. Alternatively or in addition, the method may comprise the step of generating a frame of the output stereo signal following the first signal frame based on an auxiliary audio signal and based on the first parametric stereo parameter; wherein the auxiliary audio signal is obtained from the received two-channel audio signal following the first signal frame.

According to a further aspect, a software program is described. The software program may be adapted for execution on a processor and for performing the method steps outlined in the present document when carried out on a computing device.

According to another aspect, a storage medium is described. The storage medium may comprise a software program adapted for execution on a processor and for performing the method steps outlined in the present document when carried out on a computing device.

According to a further aspect, a computer program product is described. The computer program may comprise executable instructions for performing the method steps outlined in the present document when executed on a computer.

It should be noted that the methods and systems including their preferred embodiments as outlined in the present patent application may be used stand-alone or in combination with the other methods and systems disclosed in this document. Furthermore, all aspects of the methods and systems outlined in the present patent application may be arbitrarily combined. In particular, the features of the claims may be combined with one another in an arbitrary manner.

DESCRIPTION OF DRAWINGS

The invention is explained below by way of illustrative examples with reference to the accompanying drawings, wherein.

DETAILED DESCRIPTION

Figure 1:
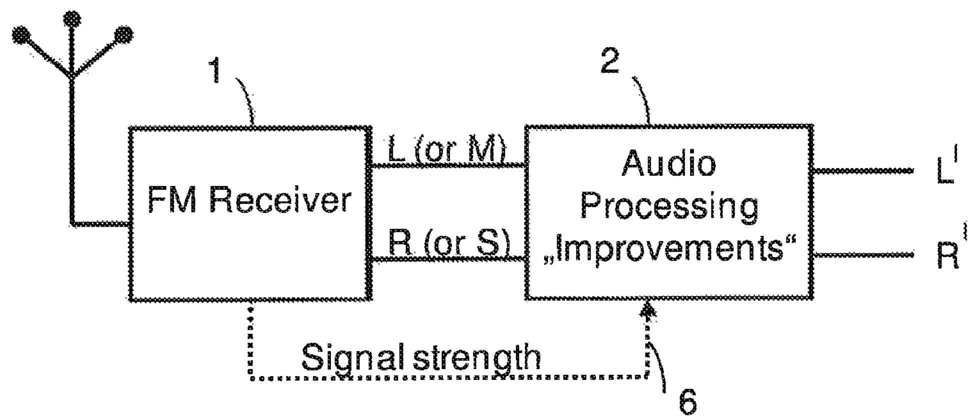
FIG. 1 illustrates a schematic embodiment for improving the stereo output of an FM stereo radio receiver.

FIG. 1 shows a simplified schematic embodiment for improving the stereo output of an FM stereo radio receiver 1. As discussed in the background section, in FM radio the stereo signal is transmitted by design as a mid signal and side signal. In the FM receiver 1, the side signal is used to create the stereo difference between the left channel L and the right channel R at the output of the FM receiver 1 (at least when reception is good enough and the side signal information is not muted). The left and right channels L, R may be digital or analog signals. For improving the audio signals L, R of the FM receiver, an audio processing apparatus 2 is used which generates a stereo audio signal L' and R' at its output. The audio processing apparatus 2 corresponds to a system which is enabled to perform noise reduction of a received FM radio signal using parametric stereo. The audio processing in the apparatus 2 is preferably performed in the digital domain; thus, in case of an analog interface between the FM receiver 1 and the audio processing apparatus 2, an analog-to-digital converter is used before digital audio processing in the apparatus 2. The FM receiver 1 and the audio processing apparatus 2 may be integrated on the same semiconductor chip or may be part of two semiconductor chips. The FM receiver 1 and the audio processing apparatus 2 can be part of a wireless communication device such as a cellular telephone, a personal digital assistant (FDA) or a smart phone. In this case, the FM receiver 1 may be part of the baseband chip having additional FM radio receiver functionality.

Instead of using a left/right representation at the output of the FM receiver 1 and the input of the apparatus 2, a mid/side representation may be used at the interface between the FM receiver 1 and the apparatus 2 (see M, S in FIG. 1 for the mid/side representation and L, R for the left/right representation). Such a mid/side representation at the interface between the FM receiver 1 and the apparatus 2 may result in less effort since the FM receiver 1 already receives a mid/side signal and the audio processing apparatus 2 may directly process the mid/side signal without downmixing. The mid/side representation may be advantageous if the FM receiver 1 is tightly integrated with the audio processing apparatus 2, in particular if the FM receiver 1 and the audio processing apparatus 2 are integrated on the same semiconductor chip.

Optionally, a signal strength signal 6 indicating the radio reception condition may be used for adapting the audio processing in the audio processing apparatus 2. This will be explained later in this specification.

The combination of the FM radio receiver 1 and the audio processing apparatus 2 corresponds to an FM radio receiver having an integrated noise reduction system.

Figure 2:
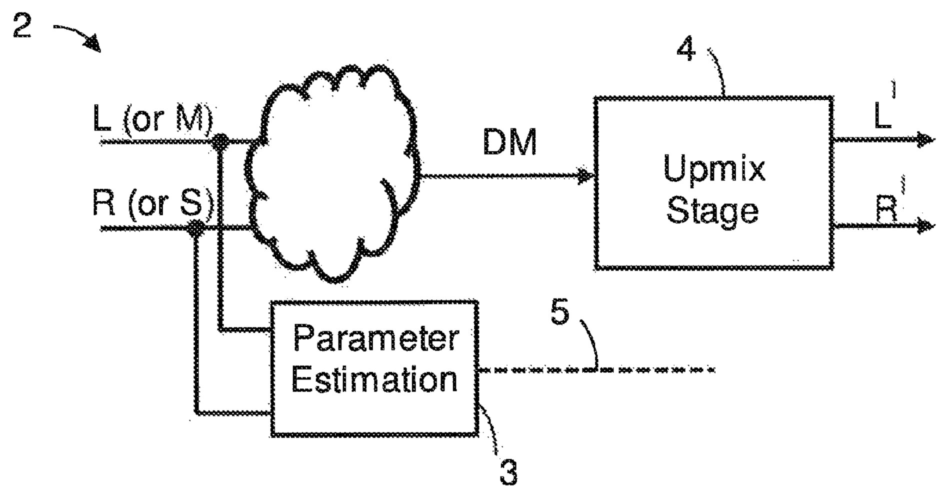
FIG. 2 illustrates an embodiment of the audio processing apparatus based on the concept of parametric stereo.

FIG. 2 shows an embodiment of the audio processing apparatus 2 which is based on the concept of parametric stereo. The apparatus 2 comprises a PS parameter estimation stage 3. The parameter estimation stage 3 is configured to determine PS parameters 5 based on the input audio signal to be improved (which may be either in left/right or mid/side representation). The PS parameters 5 may include, amongst others, a parameter indicating inter-channel intensity differences (IID or also called CLD—channel level differences) and/or a parameter indicating an inter-channel cross-correlation (ICC). Preferably, the PS parameters 5 are time- and frequency-variant. In case of an M/S representation at the input of the parameter estimation stage 3, the parameter estimation stage 3 may nevertheless determine PS parameters 5 which relate to the L/R channels.

An audio signal DM is obtained from the input signal. In case the input audio signal uses already a mid/side representation, the audio signal DM may directly correspond to the mid signal. In case the input audio signal has a left/right representation, the audio signal is generated by downmixing the audio signal. Preferably, the resulting signal DM after downmix corresponds to the mid signal M and may be generated by the following equation:

$$DM=(L+R)/a, \text{ e.g. with } a=2,$$

i.e. the downmix signal DM may correspond to the average of the L and R signals. For different values of a, the average of the L and R signals is amplified or attenuated.

The apparatus further comprises an upmix stage 4 also called stereo mixing module or stereo upmixer. The upmix stage 4 is configured to generated a stereo signal L', R' based on the audio signal DM and the PS parameters 5. Preferably, the upmix stage 4 does not only use the DM signal but also uses a side signal or some kind of pseudo side signal (not shown). This will be explained later in the specification in connection with more extended embodiments in FIGS. 4 and 5.

The apparatus 2 is based on the idea that due to its noise the received side signal may be too noisy for reconstructing the stereo signal by simply combining the received mid and side signals; nevertheless, in this case the side signal or side signal's component in the L/R signal may be still good enough for stereo parameter analysis in the PS parameter estimation stage 3. The resulting PS parameters 5 can be then used for generating a stereo signal L', R' having a reduced level of noise in comparison to the audio signal directly at the output of the FM receiver 1.

Thus, a bad FM radio signal can be "cleaned-up" by using the parametric stereo concept. The major part of the distortion and noise in an FM radio signal is located in the side channel which may be not used in the PS downmix. Nevertheless, the side channel is, even in case of bad reception, often of sufficient quality for PS parameter extraction.

In all the following drawings, the input signal to the audio processing apparatus 2 is a left/right stereo signal. With minor modifications to some modules within the audio processing apparatus 2, the audio processing apparatus 2 can also process an input signal in mid/side representation. Therefore, the concepts discussed herein can be used in connection with an input signal in mid/side representation.

Figure 3:
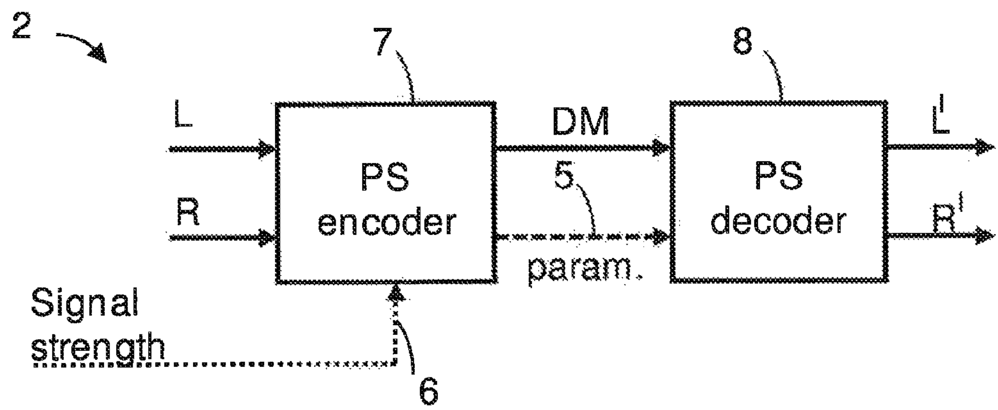
FIG. 3 illustrates another embodiment of the PS based audio processing apparatus having a PS encoder and a PS decoder.

FIG. 3 shows an embodiment of the PS based audio processing apparatus 2, which makes use of a PS encoder 7 and a PS decoder 8. The parameter estimation stage 3, in this example, is part of the PS encoder 7 and the upmix stage 4 is part of the PS decoder 8. The terms "PS encoder" and "PS decoder" are used as names for describing the function of the audio processing blocks within the apparatus 2. It should be noted that the audio processing is all happening at the same FM receiver device. These PS encoding and PS decoding processes may be tightly coupled and the terms "PS encoding" and "PS decoding" are only used to describe the heritage of the audio processing functions.

The PS encoder 7 generates—based on the stereo audio input signal L, R—the audio signal DM and the PS parameters 5. Optionally, the PS encoder 7 further uses a signal strength signal 6. The audio signal DM is a mono downmix and preferably corresponds to the received mid signal. When summing the L/R channels to form the DM signal, the information of the received side channel may be completely excluded in the DM signal. Thus, in this case only the mid information is contained in the mono downmix DM. Hence, any noise from the side channel may be excluded in the DM signal. However, the side channel is part of the stereo parameter analysis in the encoder 7 as the encoder 7 typically takes L=M+S and R=M−S as input (consequently, DM=(L+R)/2=M).

The mono signal DM and the PS parameters 5 are subsequently used in the PS decoder 8 to reconstruct the stereo signal L', R'.

Figure 4:
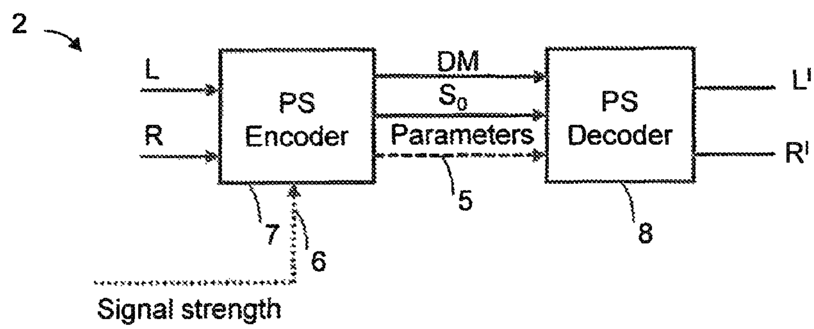
FIG. 4 illustrates an extended version of the audio processing apparatus of FIG. 3.

FIG. 4 shows an extended version of the audio processing apparatus 2 of FIG. 3. Here, in addition to the mono downmix signal DM and the PS parameters also the originally received side signal $S_0$ is passed on to the PS decoder 8. This approach is similar to "residual coding" techniques from PS coding, and allows to make use of at least parts (e.g. certain frequency bands) of the received side signal $S_0$ in case of good but not perfect reception conditions. The received side signal $S_0$ is preferably used in case the mono downmix signal corresponds to the mid signal. However, in case the mono downmix signal does not correspond to the mid signal, a more generic residual signal can be used instead of the received side signal $S_0$. Such a residual signal indicates the error associated with representing original channels by their downmix and PS parameters and is often used in PS encoding schemes. In the following, the remarks to the use of the received side signal $S_0$ apply also to a residual signal.

Figure 5:
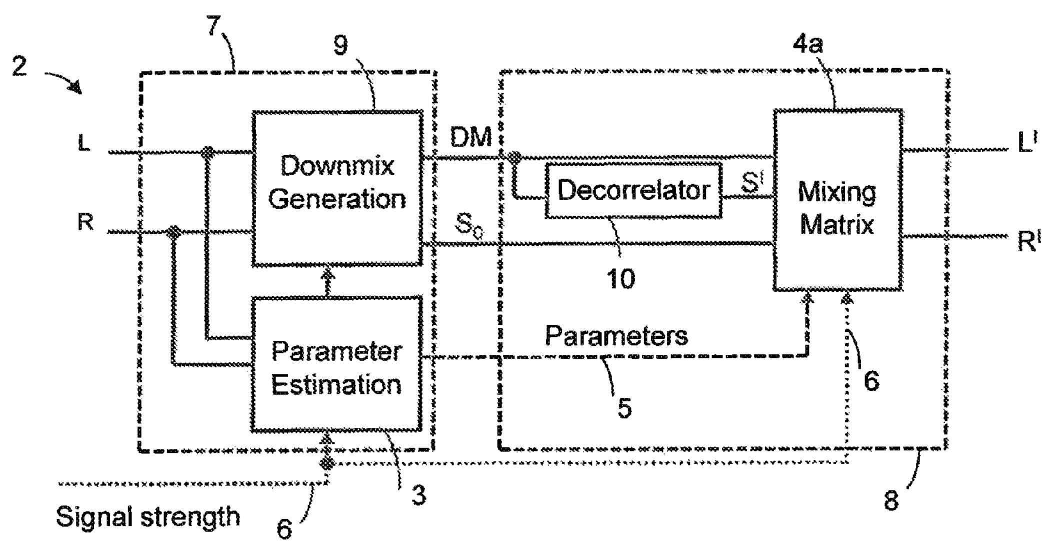
FIG. 5 illustrates an embodiment of the PS encoder and the PS decoder of FIG. 4.

FIG. 5 shows an embodiment of the PS encoder 7 and the PS decoder 8 of FIG. 4. The PS encoder module 7 comprises a downmix generator 9 and a PS parameter estimation stage 3. E.g. the downmix generator 9 may create a mono downmix DM which preferably corresponds to a mid signal M (e.g. DM=M=(L+R)/a) and may optionally also generate a second signal which corresponds to the received side signal $S_0$=(L−R)/a.

The PS parameter estimation stage 3 may estimate as PS parameters 5 the correlation and the level difference between the L and R inputs. Optionally, the parameter estimation stage receives the signal strength 6. This information can be used to decide about the reliability of the PS parameters 5. In case of a low reliability, e.g. in case of a low signal strength 6, the PS parameters 5 may be set such that the output signal L', R' is a mono output signal or a pseudo stereo output signal. In case of a mono output signal, the output signal L' is equal to the output signal R'. In case of a pseudo stereo output signal, default PS parameters may be used to generate a pseudo or default stereo output signal L', R'.

The PS decoder module 8 comprises a stereo mixing matrix **4*a* and a decorrelator 10. The decorrelator receives the mono downmix DM and generates a decorrelated signal S which is used as a pseudo side signal. The decorrelator 10 may be realized by an appropriate all-pass filter as discussed in section 4 of the cited document "Low Complexity Parametric Stereo Coding in MPEG-4". The stereo mixing matrix 4*a*** is a 2×2 upmix matrix in this embodiment.

Dependent upon the estimated parameters 5, the stereo mixing matrix **4*a* mixes the DM signal with the received side signal $S_0$ or the decorrelated signal S' to create the stereo output signals L' and R'. The selection between the signal $S_0$ and the signal S' may depend on a radio reception indicator indicative of the reception conditions, such as the signal strength 6**. One may instead or in addition use a quality indicator indicative of the quality of the received side signal. One example of such a quality indicator may be an estimated noise (power) of received the side signal. In case of a side signal comprising a high degree of noise, the decorrelated signal S' may be used to create the stereo output signal L' and R', whereas in low noise situations, the side signal $S_0$ may be used. Various embodiments for estimating the noise of the received side signal are discussed later in this specification.

The upmix operation is preferably carried out according to the following matrix equation:

$$\begin{pmatrix} L' \\ R' \end{pmatrix} = \begin{pmatrix} \alpha & \beta \\ \gamma & \delta \end{pmatrix} \begin{pmatrix} DM \\ S \end{pmatrix}$$

Here, the weighting factors α, β, γ, δ determine the weighting of the signals DM and S. The mono downmix DM preferably corresponds to the received mid signal. The signal S in the formula corresponds either to the decorrelated signal S' or to the received side signal $S_0$. The upmix matrix elements, i.e. the weighting factors α, β, γ, δ, may be derived e.g. as shown the cited paper "Low Complexity Parametric Stereo Coding in MPEG-4" (see section 2.2), as shown in the cited MPEG-4 standardization document ISO/IEC 14496-3:2005 (see section 8.6.4.6.2) or as shown in MPEG Surround specification document ISO/IEC 23003-1 (see section 6.5.3.2). These sections of the documents (and also sections referred to in these sections) are hereby incorporated by reference for all purposes.

In certain reception conditions, the FM receiver 1 only provides a mono signal, with the conveyed side signal being muted. This will typically happen when the reception conditions are very bad and the side signal is very noisy. In case the FM stereo receiver 1 has switched to mono playback of the stereo radio signal, the upmix stage preferably uses upmix parameters for blind upmix, such as preset upmix parameters, and generates a pseudo stereo signal, i.e. the upmix stage generates a stereo signal using the upmix parameters for blind upmix.

There are also embodiments of the FM stereo receiver 1 which switch, at too poor reception conditions, to mono playback. If the reception conditions are too poor for estimation of reliable PS parameters 5, the upmix stage preferably uses upmix parameters for blind upmix and generates a pseudo stereo signal based thereon.

Figure 6:
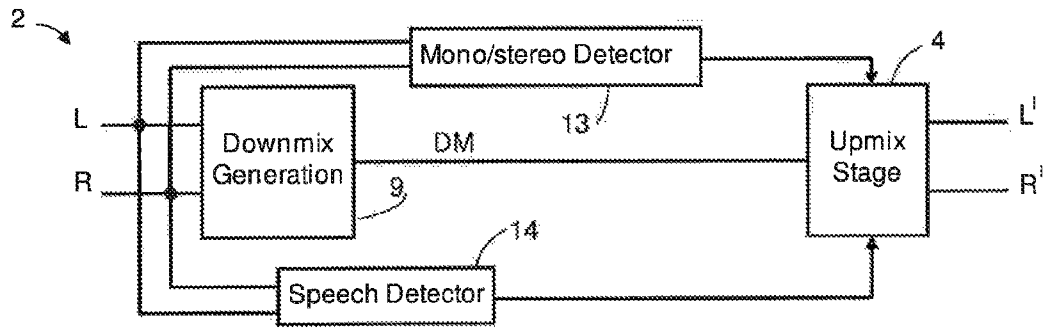
FIG. 6 illustrates another embodiment of the audio processing apparatus for pseudo-stereo generation in case of mono only output of the FM receiver.

FIG. 6 shows an embodiment for the pseudo-stereo generation in case of mono only output of the FM receiver 1. Here, a mono/stereo detector 13 is used to detect whether the input signal to the apparatus 2 is mono, i.e. whether the signals of the L and R channels are the same. In case of mono playback of the FM receiver 1, the mono/stereo detector 13 indicates to upmix to stereo using e.g. a PS decoder with fixed upmix parameters. In other words: in this case, the upmix stage 4 does not use PS parameters from the PS parameter estimation stage 3 (not shown in FIG. 6), but uses fixed upmix parameters (not shown in FIG. 6).

Optionally, a speech detector 14 may be added to indicate if the received signal is predominantly speech or music. Such speech detector 14 allows for signal dependent blind upmix. E.g. such a speech detector 14 may allow for signal dependent upmix parameters. Preferably, one or more upmix parameters may be used for speech and different one or more upmix parameters may be used for music. Such a speech detector 14 may be realized by a Voice Activity Detector (VAD).

Strictly speaking, the upmix stage 4 in FIG. 6 comprises a decorrelator 10, a 2×2 upmix matrix 4*a*, and means to convert the output of the mono/stereo detector 13 and the speech detector 14 into some form of PS parameters used as input to the actual stereo upmix.

Figure 7:
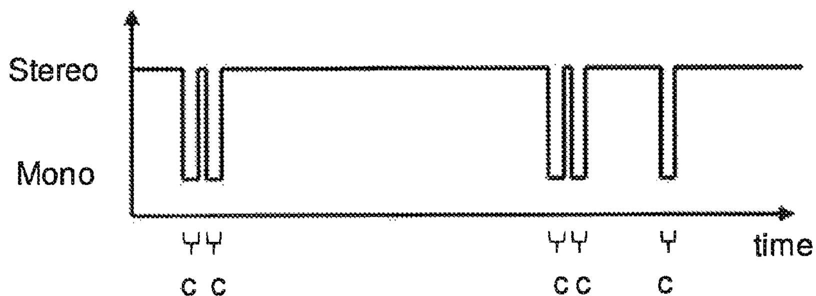
FIG. 7 illustrates the occurrence of short drop-outs in stereo playback at the output of the FM receiver.

FIG. 7 illustrates a common problem when the audio signal provided by the FM receiver 1 toggles between stereo and mono due to time-variant bad reception conditions (e.g. "fading"). To maintain a stereo sound image during mono/stereo toggling, error concealment techniques may be used Time intervals where concealment shall be applied are indicated by "C" in FIG. 7. An approach to concealment in PS coding is to use upmix parameters which are based on the previously estimated PS parameters in case that new PS parameters cannot be computed because the audio output of the FM receiver 1 dropped down to mono. E.g. the upmix stage 4 may continue to use the previously estimated PS parameters in case that new PS parameters cannot be computed because the audio output of the FM receiver 1 dropped down to mono. Thus, when the FM stereo receiver 1 switches to mono audio output, the stereo upmix stage 4 continues to use the previously estimated PS parameters from the PS parameter estimation stage 3. If the dropout periods in the stereo output are short enough so that the stereo sound image of the FM radio signal remains similar during a dropout period, the dropout is not audible or only scarcely audible in the audio output of the apparatus 2. Another approach may be to interpolate and/or extrapolate upmix parameters from previously estimated parameters. With respect to determination of upmix parameters based on the previously estimated PS parameters, one may, in light of the teachings herein, also use other techniques known e.g. from error concealment mechanisms that can be used in audio decoders to mitigate the effect of transmission errors (e.g. corrupt or missing data).

The same approach of using upmix parameters based on the previously estimated PS parameters can be also applied if the FM receiver provides a noisy stereo signal during a short period of time, with the noisy stereo signal being too bad to estimate reliable PS parameters based thereon.

As outlined above, it is desirable to maintain a stereo image during the stereo interrupts depicted in FIG. 7, in order to avoid sudden perceived discontinuities of the stereo width. This can be achieved by the above mentioned concealment techniques. However, it may be a problem to detect these mono dropouts in a reliable way. A possible mono/stereo detector could be based on detecting mono sections of the signal which meet the condition left signal=right signal (or left signal−right signal=0). Such a mono/stereo detector would, however, lead to an instable behavior for the concealment process, due to the fact that the left signal and right signal energies, as well as the side signal energy, can fluctuate a lot even in healthy reception conditions.

Figure 8:
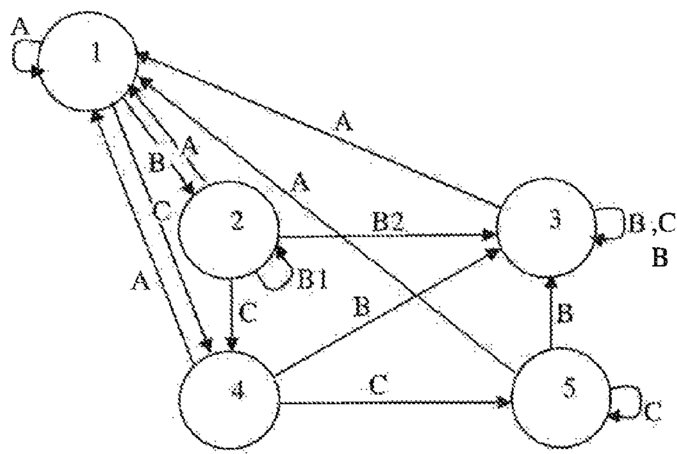
FIG. 8 illustrates an example state machine which is used for performing mono dropout detection and mono error concealment.

In order to avoid such instable behavior of the concealment, the mono/stereo detection and the concealment mechanism could be implemented as a state machine. An example state machine is illustrated in FIG. 8. The state machine of FIG. 8 makes use of two reference levels of the absolute energy of the side signal S. i.e. $E_S$. The side signal S used to calculate $E_s$ may have been high pass filtered with a cutoff frequency of typically 250 Hz. These reference levels are an upper reference level ref_high and a lower reference level ref_low. Above the upper reference level (ref_high) the signal is considered to be stereo and below the lower reference levels (ref_low) it is considered to be mono.

The side signal energy $E_S$ is calculated as a control parameter of the state machine. $E_S$ may be calculated over a time window that could e.g. correspond to the time period of validity of the PS parameters. In other words, the frequency of determining the side signal energy may be aligned to the frequency of determining the PS parameters. In this document, the time period for determining the side signal energy $E_S$ (and possibly the PS parameters) is referred to as a signal frame. The state machine of FIG. 8 comprises five conditions, which are verified each time the energy $E_S$ of a new frame is calculated:

- Condition A indicates that the side signal energy $E_S$ exceeds the upper reference level ref_high. The upper reference level may be referred to as the higher threshold.
- Condition B indicates that the side signal energy $E_S$ is lower than or equal to the upper reference level ref_high and higher than or equal to the lower reference level ref_low. The lower reference level may be referred to as the lower threshold.
- Condition B1 corresponds to condition B, but adds an additional time condition. The time condition stipulates that condition B is met less than a threshold number of frames or less than a threshold time. This threshold may be referred to as the frame threshold.

Condition B2 corresponds to condition B, with the additional time condition stipulating that condition B is met more than or equal to the threshold number of frames or more than or equal to the threshold time.

Condition C indicates that the side signal energy $E_S$ is lower than the lower reference level ref_low.

Furthermore, the example state machine of FIG. 8 makes use of five states. The different states are reached subject to the above mentioned conditions and subject to the state diagram illustrated in FIG. 8. The following actions are typically performed in the different states:

In state 1 normal stereo operation is performed, e.g. based on the PS parameters which are determined from the current audio signal.

In state 2 normal stereo operation is performed based on PS parameters determined on the current audio signal. This state is only transitional, in view of the fact that either condition B is met for a number of frames more than or equal to the frame threshold or for a time more than or equal to the time threshold (i.e. condition B2) or prior to this lapse of number of frames or lapse of time, condition A is met.

In state 3 stereo operation is performed based on PS parameters determined on the current audio signal. It can be seen that state 3 can be reached on a path going from state 1 via state 2 to state 3. In view of the fact that condition B2 requires a minimum number of frames or a minimum amount of time for the transition, the path "state 1, state 2, state 3" represents a slow, i.e. smooth, transition from a normal stereo operation (e.g. music) to a normal mono operation (e.g. speech).

In state 4 error concealment is started using previously determined PS parameters, e.g. the most recent PS parameters which were determined in state 1. It can be seen that state 4 can be reached from state 1 directly, if condition C is met, i.e. if the side signal energy $E_S$ steeply drops from above ref_high to below ref_low. Alternatively, state 4 can be reached from state 1 via state 2, however, only if condition B is met for only a few number of frames or only a short period of time. As such, the paths "state 1, state 4" and "state 1, state 2, state 4" represent a fast, i.e. abrupt, transition from a normal stereo operation (e.g. music) to a forced mono operation. The forced mono operation is typically due to the FM receiver which abruptly cuts off the side signal if the level of noise in the side signal exceeds a pre-determined level.

In state 5 error concealment is continued e.g. based on the PS parameters which have been established in state 4. In the illustrated embodiment, state 5 can only be reached from state 4 if condition C is met, i.e. state 5 represents the stable error concealment state, where previously determined PS parameters are used in order to generate a stereo audio signal from a mid signal. The PS parameters may decay to mono with a time constant of a few seconds. The time constants of IID and ICC parameters may be different.

As already indicated, the illustrated state diagram ensures that concealment is triggered only if the audio signal received by the FM receiver goes from stereo to mono within a few time windows, i.e. if the transition from stereo to mono is abrupt. On the other hand, trigging of concealment is prevented in cases where there is noise in the side signal with energy $E_S$ below stereo level (ref_high) but above mono level (ref_low), i.e. in cases where there is still sufficient information within the side signal to generate appropriate PS parameters. At the same time, even when the signal changes from stereo to mono, e.g. when the signal transits from music to speech, the concealment detection will not be triggered, thereby ensuring that the original mono signal is not rendered into an artificial stereo signal due to the erroneous application of concealment. An authentic transition from stereo to mono can be detected based on a smooth transition of the side signal energy $E_S$ from above ref_high to below ref_low.

The stereo (PS) parameters (e.g. IID and ICC) from one of the previous time windows are used when concealment is triggered. By optionally using low-pass filtered values of the PS parameters instead of a snapshot of the PS parameters, the choice of parameters can be made less sensitive to the risk of freezing of an awkward stereo image. In other words, it may be beneficial to use low pass filtered or averaged PS parameters from a certain number of frames or a certain lapse of time prior to the triggering of concealment, in order to prevent the use of an inappropriate set of PS parameters. The parameter values may decay to mono.

As can be seen in FIG. 8 the concealment is terminated when the side signal exceeds the mono level (ref_low). Hence, newly assessed stereo parameters are used again. This is due to the fact that the side signal is considered to comprise sufficient information for determining PS parameters if the side signal energy $E_S$ is above the threshold ref_low.

Figure 9:
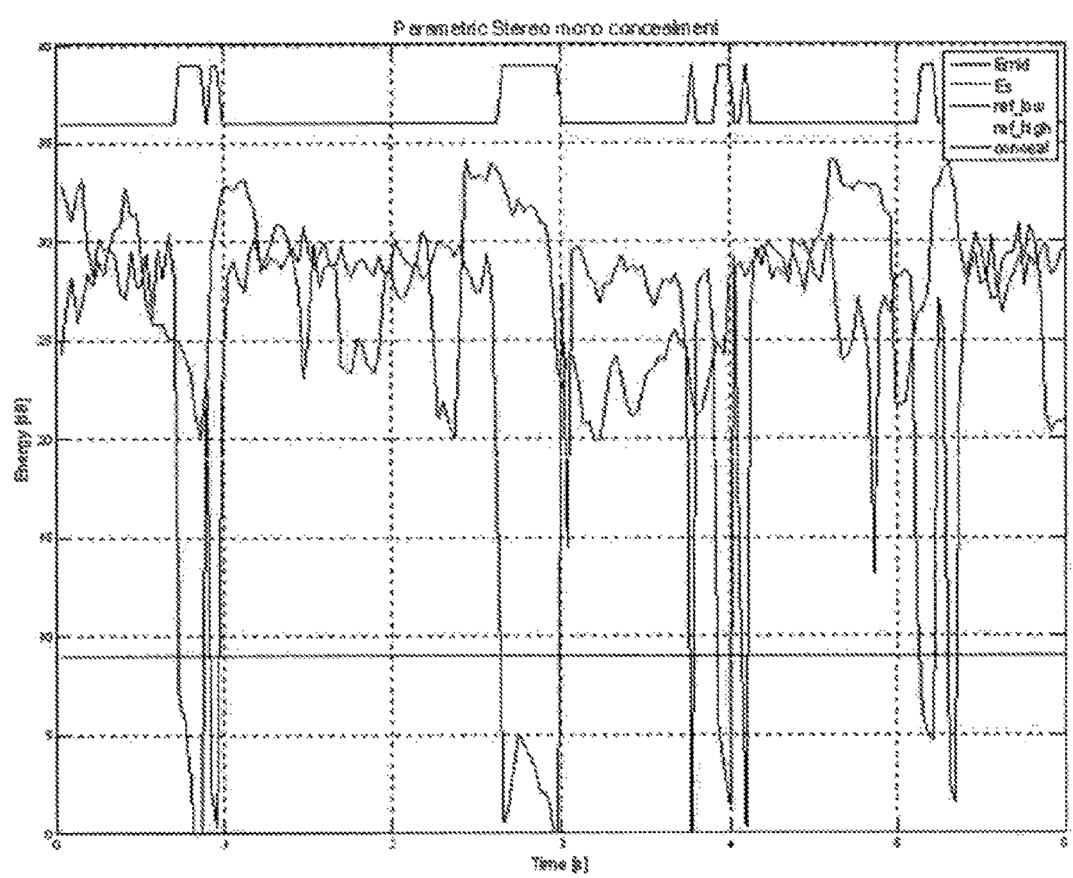
FIG. 9 illustrates an example error concealment of a signal with mono dropouts.

FIG. 9 shows for an example audio signal, how concealment is activated when the energy of the side signal falls below the lower reference level (ref_low). FIG. 9 illustrates the mid signal energy $E_{mid}$ (reference numeral 30), as well as the side signal energy $E_S$ (reference numeral 31) of a received audio signal. Furthermore, FIG. 9 shows the upper threshold ref_high (reference numeral 32) and the lower threshold ref_low (reference numeral 33). The triggering of concealment is illustrated in the upper graph 34, wherein the lower value indicates that normal operation using currently determined PS parameters is performed and wherein the upper value indicates that concealment is performed using previously determined PS parameters.

In an embodiment, a Spectral Flatness Measure (SFM) is used for side signal noise detection, in order to further improve the prevention of false mono dropout detection. As indicated above, it is beneficial to reliably distinguish between mono dropouts caused by a deteriorated side signal and authentic transitions between stereo to mono. An approach to perform such distinction is the use of a state diagram as outlined above. The spectral flatness of the spectrum of the side signal may be a further measure to distinguish between a deteriorated noise side signal and an authentic mono signal. A spectral flatness measure may be given by $$SFM = \frac{\left(\prod_{k=0}^{N-1} E\{X_s^2(k)\}\right)^{1/N}}{\frac{1}{N}\sum_{k=0}^{N-1} E\{X_s^2(k)\}}$$

wherein $E\{X_s^2(k)\}$ denotes the power of the side signal in the hybrid filterbank band k. The hybrid filterbank used in the example PS system consists of 64 QMF bands, where the 3 lowest bands are further divided into 4+2+2 bands (hence, N=64−3+4+2+2=69). The SFM may be described as the ratio between the geometric mean of the power spectrum and the arithmetic mean of the power spectrum.

Alternatively, the SFM may be calculated on a subset of the spectrum, only including the hybrid filterbank bands ranging from $K_{start}$ to $K_{stop}$. That way e.g. one or a few of the first bands can be excluded in order to remove an unwanted DC, e.g. low frequency, offset. When adjusting the band borders accordingly the SFM yields:

$$SFM = \frac{\left(\prod_{k=K_{start}}^{K_{stop}} E\{X_s^2(k)\}\right)^{1/(K_{stop}-K_{start}+1)}}{\frac{1}{(K_{stop}-K_{start}+1)}\sum_{k=K_{start}}^{K_{stop}} E\{X_s^2(k)\}}.$$

For reasons of limiting the computational complexity, the SFM formula may alternatively be replaced by numerical approximations of it based on e.g. a Taylor expansion, look-up table, or similar techniques commonly known for experts in the field of software implementations.

Furthermore, there are other obvious prior-art methods of measuring spectral flatness, such as e.g. the standard deviation or the difference between minimum and maximum of the frequency power bins, etc. Let hereby the term "SFM" denote any of these measures.

A high spectral flatness indicates that the spectrum has a similar amount of power in all spectral bands. On the other hand, a low spectral flatness indicates that the spectral power is concentrated in a relatively small number of bands. Consequently, a high SFM value indicates a noisy side signal, wherein a low SFM value indicates a side signal which may comprise information.

Figure 10:
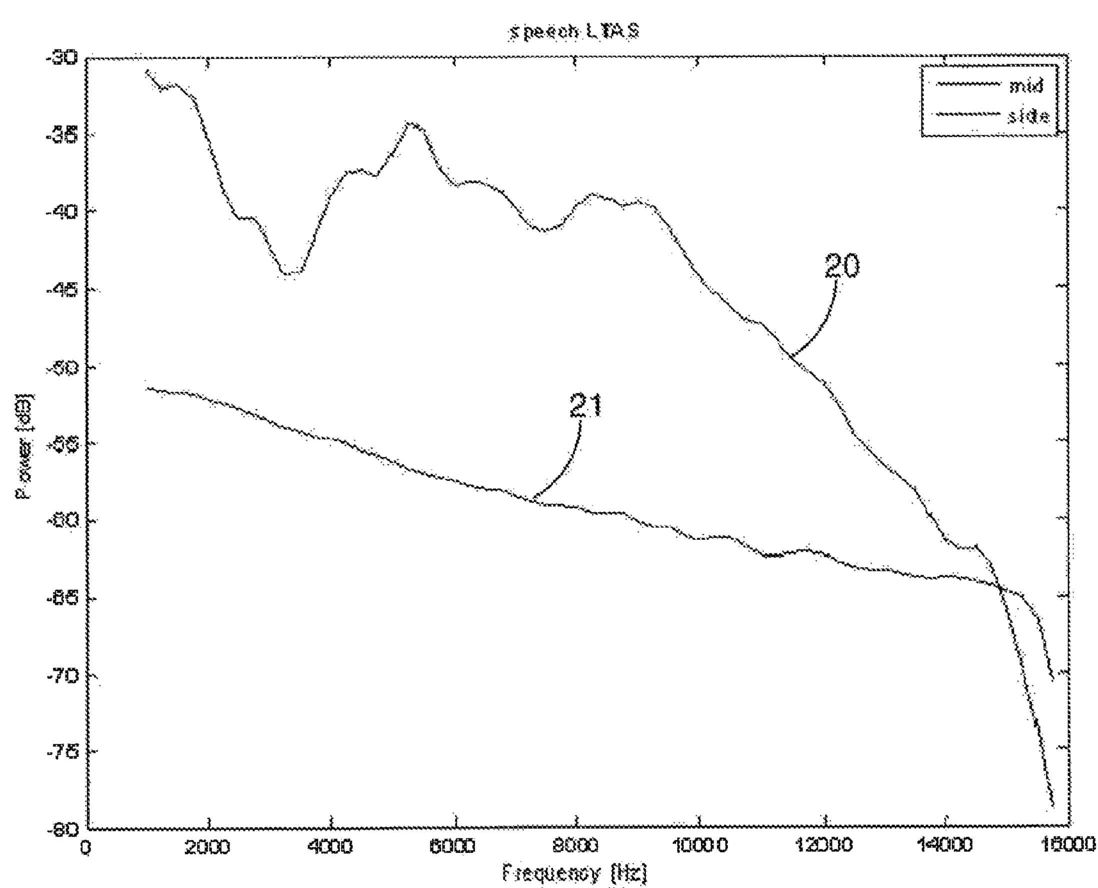
FIG. 10 illustrates the power spectrum for an example audio signal.

In FIG. 10, the power spectrum of the mid and side signal of a noisy speech signal is depicted. It can be seen that the power spectrum of the mid signal 20 is relatively steep with high levels of energy in the lower frequency range. On the other hand, the side signal 21, which in the illustrated case of a mono speech signal mainly comprises noise, has an overall low degree of energy and a relatively flat power spectrum.

Since the power spectrum of the side signal noise 21 has a characteristic slope, the SFM may be determined based on a slope compensated power spectrum. I.e. an SFM value may be determined from a slope compensated power spectrum using the above formula. The slope used to compensate the power spectrum may be pre-determined, e.g. as the average slope of the power spectrum of a plurality of test side signals. These test side signals may be the side signals of mono signals, e.g. mono speech signals, thereby yielding a typical/average slope for the side signal noise comprised in mono signals, e.g. mono speech signals. Alternatively or in addition, the slope used to compensate the power spectrum may be determined using current frames of the side signal, thereby providing an adaptive slope compensation. This could be done using linear regression techniques.

Using the above measure, an SFM value may be determined for each signal frame, thereby yielding an SFM signal for a sequence of signal frames. This SFM signal may be smoothed (lowpass filtered) along the frame/time axis. The SFM values or the (smoothed) SFM signal may be used as a noise measure. In particular, the SFM values may be used to identify occasional noise bursts in an authentic mono signal. By way of example, the audio signal may be a mono speech signal and the state machine of FIG. 8 may be in state 3. An occasional noise burst in the side signal, i.e. an occasional increase of energy $E_S$, may trigger conditions A, thereby triggering a transition from state 3 to state 1, even though the audio signal is still a mono speech signal. An abrupt end of the noise burst could then trigger a transition to state 4 (either directly or via state 2), thereby initiating undesired concealment for a mono speech signal. In order to avoid such an undesirable situation, the SFM values or (smoothed) SFM signal may be used as an additional condition. By way of example, condition A could be additionally made dependent on the (smoothed) SFM signal, thereby differentiating between side signal energy which is due to a stereo signal and side signal energy which is due to noise bursts. In an embodiment, if the (smoothed) SFM signal exceeds a certain threshold, the concealment detection may be inactivated. Overall, it is to be noted that the use of SFM makes it possible to avoid false concealment detections which otherwise might occur for typical mono speech signals with occasional noise bursts in the side signal.

Figure 11:
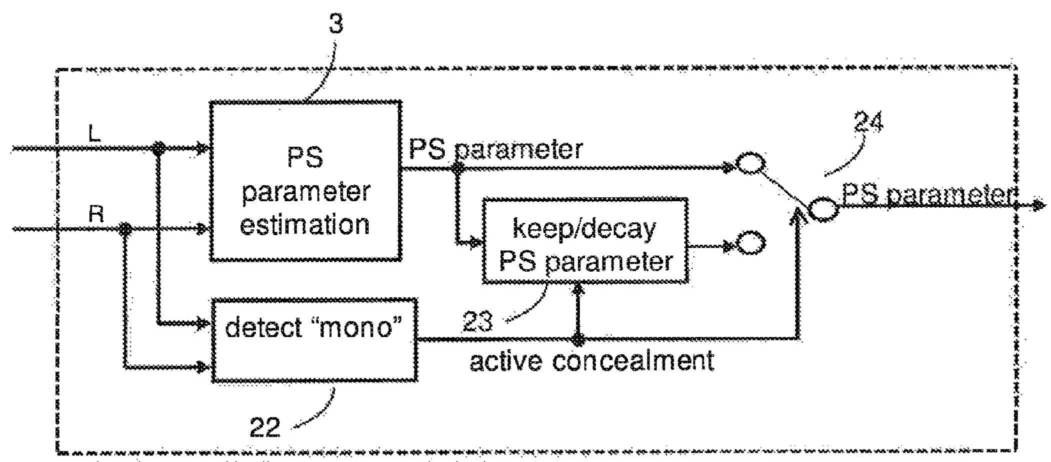
FIG. 11 illustrates an example PS parameter estimation stage using error concealment.

In FIG. 11 an example PS parameter estimation stage comprising concealment is illustrated. This PS parameter estimation stage may be referred to as a modified PS parameter estimation stage. A two-channel audio signal comprising a left and a right signal enters the PS parameter estimation stage 3 which determines a set of PS parameters based on one or more current frames of the two-channel audio signal. The left and right audio signals also enter a "mono" detection stage or concealment detection stage 22 which is configured to determine if concealment is to be performed. For this purpose, the "mono" detection stage 22 may use any of the methods outlined in the present document. The modified PS parameter estimation stage also comprises a memory stage 23 which is configured to store previously determined PS parameters. In particular, the memory stage 23 may be configured to determine and store a set of PS parameters which is to be used during concealment. Furthermore, the memory stage 23 may be configured to apply a decay to the set of stored PS parameters. The decay may lead to a smooth transition from the set of stored PS parameters to a set of PS parameters adapted for rendering a mono signal. The speed of the decay or transition may be configurable. In addition, the modified PS parameter estimation stage may comprise a PS parameter selection stage 24 configured to select the PS parameters from the output of the PS parameter estimation stage 3 during stereo or authentic mono operation and from the output of the memory stage 23 during concealment operation.

Figure 12:
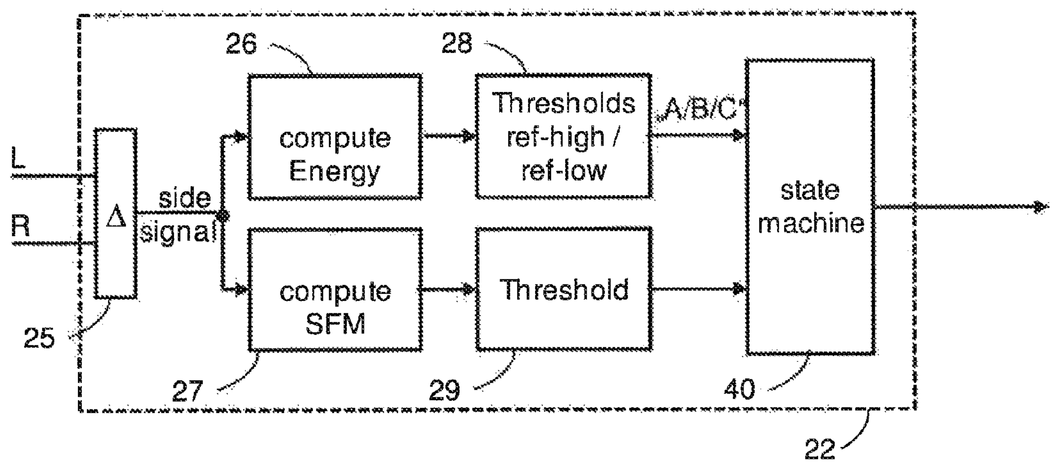
FIG. 12 illustrates an example "mono" detection stage or concealment detection stage.

FIG. 12 illustrates an example "mono" detection stage or concealment detection stage 22. A side signal is generated from the left and right audio signals using a side signal determination stage 25. Subsequently, the energy $E_S$ of the side signal is determined in the energy determination stage 26. Furthermore, an SFM value of the side signal may be determined in SFM determination stage 27. Within respective threshold verification stages 28, 29 it is determined if the energy $E_S$ and/or the SFM value of the side signal meet certain conditions. These conditions are fed into the state machine 40 in order to trigger a transition between the states of the state machine 40. The states and transitions (edges) of the state machine may be configured as outlined in the present document. As an output of the "mono" detection stage 22, the activation of concealment may be triggered.

In the following, an advanced PS parameter estimation stage 3 providing error compensation is discussed with reference to FIG. 13. In case of estimating PS parameters based on a stereo signal containing a noisy side component, there will be an error in the calculation of the PS parameters if conventional formulas for determining the PS parameters are used, such as for determining the CLD parameter (Channel Level Differences) and the ICC parameter (Inter-channel Cross-Correlation).

Figure 13:
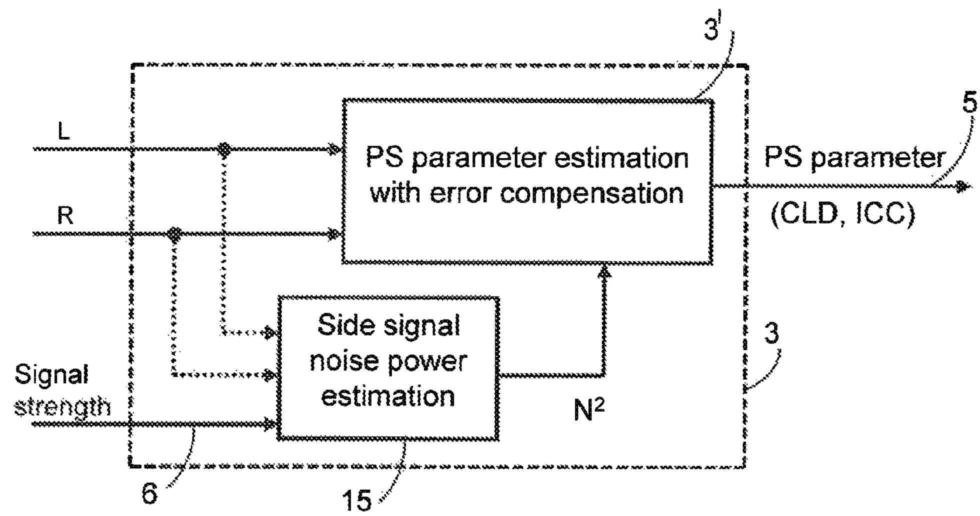
FIG. 13 illustrates an advanced PS parameter estimation stage with error compensation.

The actual noisy stereo input signal values $l_{w/noise}$ and $r_{w/noise}$, which are input to the inner PS parameter estimation stage 3' shown in FIG. 13, can be expressed in dependency of the respective values $l_{w/o\ noise}$ and $r_{w/o\ noise}$ without noise and the noise values n of the received side signal values:

$$l_{w/noise}=m+(s+n)=l_{w/o\ noise}+n$$

$$r_{w/noise}=m-(s+n)=r_{w/o\ noise}-n$$

It should be noted that here the received side signal is modeled as s+n, where "S" is the original (undistorted) side signal, and "n" is the noise (distortion signal) caused by the radio transmission channel. Furthermore, it is assumed here that the signal m is not distorted by noise from the radio transmission channel.

Thus, the corresponding input powers $L_{w/noise}^2$, $R_{w/noise}^2$ and the cross correlation $L_{w/noise}R_{w/noise}$ can be written as:

$$L_{w/noise}^2=E(l_{w/noise}^2)=E((m+s)^2)+E(n^2)=L_{w/o\ noise}^2+N^2$$

$$R_{w/noise}^2=E(r_{w/noise}^2)=E((m-s)^2)+E(n^2)=R_{w/o\ noise}^2+N^2$$

$$L_{w/noise}R_{w/noise}=E(l_{w/noise}\cdot r_{w/noise})=E((l_{w/o\ noise}+n)\cdot(r_{w/o\ noise}-n))=L_{w/o\ noise}R_{w/o\ noise}-N^2$$

with the side signal noise power estimate $N^2$, with $N^2=E(n^2)$, where "E( )" is the expectation operator.

By rearranging the above equations, the corresponding compensated powers and cross-correlation without noise can be determined to:

$$L_{w/o\ noise}^2=L_{w/noise}^2-N^2$$

$$R_{w/o\ noise}^2=R_{w/noise}^2-N^2$$

$$L_{w/o\ noise}R_{w/o\ noise}=L_{w/noise}R_{w/noise}+N^2$$

An error-compensated PS parameter extraction based on the compensated powers and cross correlation may be carried out as given by the formulas below:

$$CLD=10\cdot\log_{10}(L_{w/o\ noise}^2/R_{w/o\ noise}^2)$$

$$ICC=(L_{w/o\ noise}R_{w/o\ noise})/(L_{w/o\ noise}^2+R_{w/o\ noise}^2)$$

Such a parameter extraction compensates for the estimated $N^2$ term in the calculation of the PS parameters.

The effect of noise in the side signal is as follows: When assuming that the noise in the side signal is independent of the mid signal:

- the ICC values get closer to 0 in comparison to the ICC values estimated based on a noiseless stereo signal, and
- the CLD values in decibel get closer to 0 dB in comparison to the CLD values estimated based on a noiseless stereo signal.

For compensation of the error in the PS parameters, the apparatus 2 preferably has a noise estimate stage which is configured to determine a noise parameter characteristic for the power of the noise of the received side signal that was caused by the (bad) radio transmission. The noise parameter may then be considered when estimating the PS parameters. This may be implemented as shown in FIG. 13.

According to FIG. 13, the FM signal strength 6 may be used for at least partly compensating the error. Information on the signal strength is often available in FM radio receivers. The signal strength 6 is input to the parameter analyzing stage 3 in the PS encoder 7. In a side signal noise power estimation stage 15, the signal strength 6 may be converted to the side signal noise power estimate $N^2$. As an alternative to the signal strength 6 or in addition to the signal strength 6, the audio signal L, R may be used for estimating the signal noise power as will be discussed later on.

In FIG. 13, the side signal noise power estimation stage 15 is configured to derive the noise power estimate $N^2$ based on the signal strength 6 and/or the audio input signals (L and R). The noise power estimate $N^2$ can be both frequency-variant and time-variant.

A variety of methods can be used for determining the side signal noise power $N^2$, e.g.:

- When detecting power minima of the mid signal (e.g. pauses in speech), it can be assumed that the power of the side signal is noise only (i.e. the power of the side signal corresponds to $N^2$ in these situations).
- The $N^2$ estimate can be defined by a function of the signal strength data 6. The function (or lookup table) can be designed by experimental (physical) measurements.
- The $N^2$ estimate can be defined by a function of the signal strength data 6 and/or the audio input signals (L and R). The function can be designed by heuristic rules.
- The $N^2$ estimate can be based on studying the signal type coherence of the mid and side signals. The original mid and side signals can e.g. be assumed to have similar tonality-to-noise ratio or crest factor or other power envelope characteristics. Deviations of those properties can be used to indicate a high level of $N^2$.

The concepts discussed herein can be implemented in connection with any encoder using PS techniques, e.g. an HE-AAC v2 (High Efficiency Advanced Audio Coding version 2) encoder as defined in the standard ISO/IEC 14496-3 (MPEG-4 Audio), an encoder based on MPEG Surround or an encoder based on MPEG USAC (Unified Speech and Audio coder) as well as on encoders which are not covered by MPEG standards.

In the following, by way of example, a HE-AAC v2 encoder is assumed; nevertheless, the concepts may be used in connection with any audio encoder using PS techniques.

HE-AAC is a lossy audio compression scheme. HE-AAC v1 (HE-AAC version 1) makes use of spectral band replication (SBR) to increase the compression efficiency. HE-AAC v2 further includes parametric stereo to enhance the compression efficiency of stereo signals at very low bitrates. An HE-AAC v2 encoder inherently includes a PS encoder to allow operation at very low bitrates. The PS encoder of such an HE-AAC v2 encoder can be used as the PS encoder 7 of the audio processing apparatus 2. In particular, the PS parameter estimating stage within a PS encoder of an HE-AAC v2 encoder can be used as the PS parameter estimating stage 3 of the audio processing apparatus 2. Also the downmix stage within a PS encoder of an HE-AAC v2 encoder can be used as the downmix stage 9 of the apparatus 2.

Figure 14:
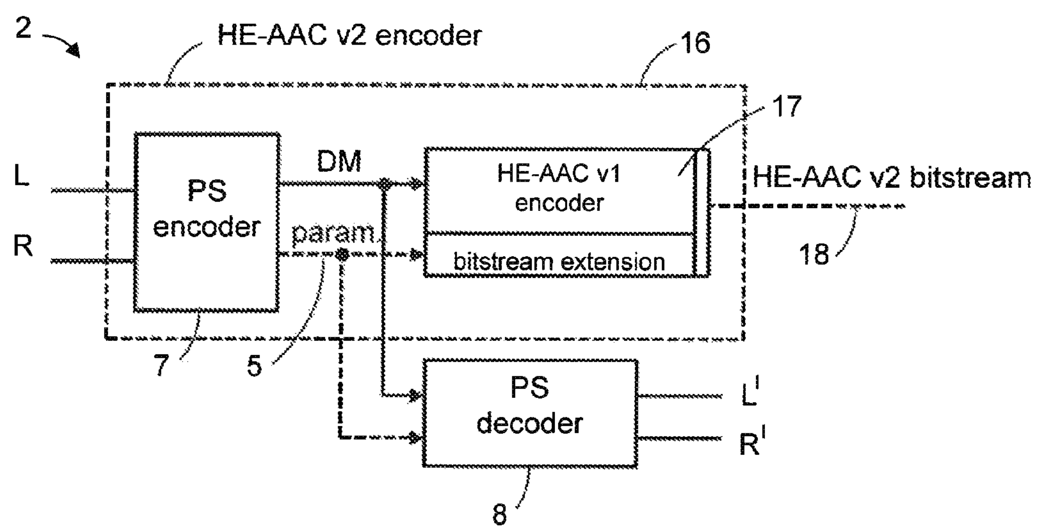
FIG. 14 illustrates a further embodiment of the audio processing apparatus based on an HE-AAC v2 encoder.

Hence, the concept discussed in this specification can be efficiently combined with an HE-AAC v2 encoder to realize an improved FM stereo radio receiver. Such an improved FM stereo radio receiver may have an HE-AAC v2 recording feature since the HE-AAC v2 encoder outputs an HE-AAC v2 bitstream which can stored for recording purposes. This is shown in FIG. 14. In this embodiment, the apparatus 2 comprises an HE-AAC v2 encoder 16 and the PS decoder 8. The HE-AAC v2 encoder provides the PS encoder 7 used for generating the mono downmix DM and the PS parameters 5 as discussed in connection with the previous drawings.

Optionally, the PS encoder 7 may be modified for the purpose of FM radio noise reduction to support a fixed downmix scheme, such as a downmix scheme according to DM=(L+R)/a.

The mono downmix DM and the PS parameters 8 may be fed to the PS decoder 8 to generate the stereo signal L', R' as discussed above. The mono downmix DM is fed to an HE-AAC v1 encoder for perceptual encoding of the mono downmix DM. The resulting perceptual encoded audio signal and the PS information are multiplexed into an HE-AAC v2 bitstream 18. For recording purposes, the HE-AAC v2 bitstream 18 can be stored in a memory such as a flash-memory or a hard-disk.

The HE-AAC v1 encoder 17 comprises an SBR encoder and an AAC encoder (not shown). The SBR encoder typically performs signal processing in the QMF (quadrature mirror filterbank) domain and thus needs QMF samples. In contrast, the AAC encoder typically needs time domain samples (typically downsampled by a factor 2).

The PS encoder 7 within the HE-AAC v2 encoder 16 typically provides the downmix signal DM already in the QMF domain.

Since the PS encoder 7 may already send the QMF domain signal DM to the HE AAC v1 encoder, the QMF analysis transform in the HE-AAC v1 encoder for the SBR analysis can be made obsolete. Thus, the QMF analysis that is normally part of the HE-AAC v1 encoder can be avoided by providing the downmix signal DM as QMF samples. This reduces the computing effort and allows for complexity saving.

The time domain samples for the AAC encoder may be derived from the input of the apparatus 2, e.g. by performing the simple operation DM=(L+R)/2 in the time domain and by downsampling the time domain signal DM. This approach is probably the cheapest approach. Alternatively, the apparatus 2 may perform a half-rate QMF synthesis of the QMF domain DM samples.

In the present document, a method and system for reducing the noise of FM radio receivers has been described. PS parameters are determined from the received mid and side signal to generate a noise reduced audio signal using the mid signal and the PS parameters. A concealment technique has been outlined to provide stereo signals, even for side signals comprising a high degree of noise. In this context, a method has been outlined, on how to reliably detect authentic mono reception situations vs. noise side signal situations.

The methods and systems described in the present document may be implemented as software, firmware and/or hardware. Certain components may e.g. be implemented as software running on a digital signal processor or microprocessor. Other components may e.g. be implemented as hardware and or as application specific integrated circuits. The signals encountered in the described methods and systems may be stored on media such as random access memory or optical storage media. They may be transferred via networks, such as radio networks, satellite networks, wireless networks or wireline networks, e.g. the internet. Typical devices making use of the methods and systems described in the present document are portable electronic devices or other consumer equipment which are used to store and/or render audio signals.

The invention claimed is:

1. A system configured to determine a parametric stereo parameter from a two-channel audio signal and configured to process frames of the two-channel audio signal using the parametric stereo parameter to generate a noise reduced two-channel audio signal; the system comprising:

a parametric stereo parameter estimation stage configured to determine a first parametric stereo parameter based on a first frame of the received two-channel audio signal; and a concealment detection stage configured to determine an energy of a side signal within the first signal frame; wherein the side signal is obtainable from the two-channel audio signal and wherein the energy is above a high threshold;

determine a transition period of a number of following successive signal frames during which the energy of the side signal drops from a value above the high threshold to a value below a low threshold;

determine that the two-channel audio signal following the first signal frame is a forced mono signal if the number of successive signal frames of the transition period is below a frame threshold; and determine the parametric stereo parameter for the processing of frames of the two-channel audio signal succeeding the first signal frame based on the first parametric stereo parameter, if it is determined that the two-channel audio signal following the first signal frame is a forced mono signal, wherein the system is carried out by one or more processors and/or one or memory devices.

2. The system of claim 1, wherein the received two-channel audio signal is presentable as a mid signal and the side signal.

3. The system of claim 1, the system further comprising:

an upmix stage configured to generate a frame of an output stereo signal following the first signal frame based on an auxiliary audio signal and based on the first parametric stereo parameter; wherein the auxiliary audio signal is obtained from the received two-channel audio signal following the first signal frame.

4. The system of claim 1, wherein the concealment detection stage is further configured to determine that the two-channel audio signal following the first signal frame is an authentic mono signal if the number of successive signal frames of the transition period is at or above the frame threshold.

5. The system of claim 1, wherein the concealment detection stage comprises:

a plurality of states specifying a plurality of modes of the system; wherein a mode of the system determines how a current frame of the two-channel audio signal is processed; and a plurality of edges specifying transition conditions between the plurality of states, thereby determining how an immediately succeeding frame to the current frame of the two-channel audio signal is processed.

6. The system of claim 5, wherein the plurality of states comprises a stereo state; wherein in the stereo state the parametric stereo parameter estimation stage is configured to determine a current parametric stereo parameter based on the current frame of the received two-channel audio signal; and the upmix stage is configured to generate a current frame of the output stereo signal based on the auxiliary audio signal and the current parametric stereo parameter; wherein the auxiliary audio signal is obtained from the current frame of the received two-channel audio signal.

7. The system of claim 6, wherein the plurality of states comprises an authentic mono state; wherein in the authentic mono state the parametric stereo parameter estimation stage is configured to determine a current parametric stereo parameter based on the current frame of the received two-channel audio signal; and the upmix stage is configured to generate a current frame of the output stereo signal based on the auxiliary audio signal and the current parametric stereo parameter;

wherein the auxiliary audio signal is obtained from the current frame of the received two-channel audio signal.

8. The system of claim 7, wherein the plurality of states comprises a concealment state; wherein in the concealment state the upmix stage is configured to generate a current frame of the output stereo signal based on the auxiliary audio signal and a stored parametric stereo parameter; wherein the auxiliary audio signal is obtained from the current frame of the received two-channel audio signal; and wherein the stored parametric stereo parameter has been determined by the parametric stereo parameter estimation stage while the system was in a previous stereo state.

9. The system of claim 8, wherein the stored parametric stereo parameter has been determined from a plurality of parametric stereo parameters.

10. The system of claim 8, wherein the plurality of edges comprises a transition from the stereo state to the authentic mono state, if the energy of the succeeding frame is below the high threshold and above the low threshold;

a transition from the stereo state to the concealment state, if the energy of the succeeding frame is below the low threshold;

a transition from the concealment state to the authentic mono state, if the energy of the succeeding frame is below the high threshold and above the low threshold;

a transition from the concealment state to the stereo state, if the energy of the succeeding frame is above the high threshold; and/or a transition from the authentic mono state to the stereo state, if the energy of the succeeding frame is above the high threshold.

11. The system of claim 10, wherein the transition from the authentic mono state to the concealment state further depends on the number of frames preceding the current frame for which the system is in the authentic mono state.

12. The system of claim 11, wherein the transition from the authentic mono state to the concealment state only occurs if the number of frames preceding the current frame for which the system is in the authentic mono state is below the frame threshold.

13. The system of claim 10, wherein the concealment detection stage is further configured to determine a spectral flatness of the succeeding frame of the side signal; and consider the spectral flatness in a transition condition of at least one of the plurality of edges.

14. The system of claim 3, wherein the mid signal M and the side signal S relate to a left audio signal L and a right audio signal R, as M=(L+R)/2 and S=(L−R)/2; and the auxiliary audio signal is determined as (L+R)/a, wherein a is a real number.

15. The system of claim 1, wherein the parametric stereo parameter comprises a parameter indicating a channel level difference and/or a parameter indicating an inter-channel cross-correlation.

16. The system of claim 1, wherein the system further comprises a noise estimation stage configured to determine a noise parameter characteristic for the noise power of the received side signal; and the parametric stereo parameter estimation stage is configured to determine the parametric stereo parameter based on the received two-channel audio signal and the noise parameter.

17. The system of claim 1, further comprising an audio encoder supporting parametric stereo, the audio encoder comprising a parametric stereo encoder, with the parametric stereo parameter estimation stage being part of the parametric stereo encoder.

18. An FM stereo radio receiver configured to receive an FM radio signal comprising a mid signal and a side signal and comprising a system according to claim 1.

19. A method for determining a parametric stereo parameter from a two-channel audio signal and configured to process frames of the two-channel audio signal using the parametric stereo parameter to generate a noise reduced two-channel audio signal; the method comprising:

determining a first parametric stereo parameter based on a first frame of the received two-channel audio signal;

determining an energy of a side signal within the first signal frame; wherein the side signal is obtainable from the two-channel audio signal and wherein the energy is above a high threshold;

determining a number of following successive signal frames during which the energy of the side signal drops from a value above the high threshold to a value below a low threshold;

determining that the two-channel audio signal following the first signal frame is a forced mono signal if the number of successive signal frames is below a frame threshold; and determining the parametric stereo parameter for the processing of frames of the two-channel audio signal succeeding the first signal frame based on the first parametric stereo parameter, if it is determined that the two-channel audio signal following the first signal frame is a forced mono signal, wherein the method is carried out by one or more processors and/or one or memory devices.

20. A non-transitory computer-readable medium with instructions stored thereon that when executed by one or more processors performs the method steps of claim 19 when carried out on a computing device.

21. An apparatus for determining a parametric stereo parameter from a two-channel audio signal and configured to process frames of the two-channel audio signal using the parametric stereo parameter to generate a noise reduced two-channel audio signal, comprising:

at least one processor; and at least one memory storing a computer program;

in which the at least one memory with the computer program is configured with the at least one processor to cause the apparatus to at least:

determining a first parametric stereo parameter based on a first frame of the received two-channel audio signal;

determining an energy of a side signal within the first signal frame; wherein the side signal is obtainable from the two-channel audio signal and wherein the energy is above a high threshold;

determining a number of following successive signal frames during which the energy of the side signal drops from a value above the high threshold to a value below a low threshold;

determining that the two-channel audio signal following the first signal frame is a forced mono signal if the number of successive signal frames is below a frame threshold; and determining the parametric stereo parameter for the processing of frames of the two-channel audio signal succeeding the first signal frame based on the first parametric stereo parameter, if it is determined that the two-channel audio signal following the first signal frame is a forced mono signal, wherein the method is carried out by one or more processors and/or one or memory devices.

* * * * *